No. 652,912. Patented July 3, 1900.
A. BRADY.
BICYCLE GEAR.
(Application filed Aug. 30, 1899.)
(No Model.)
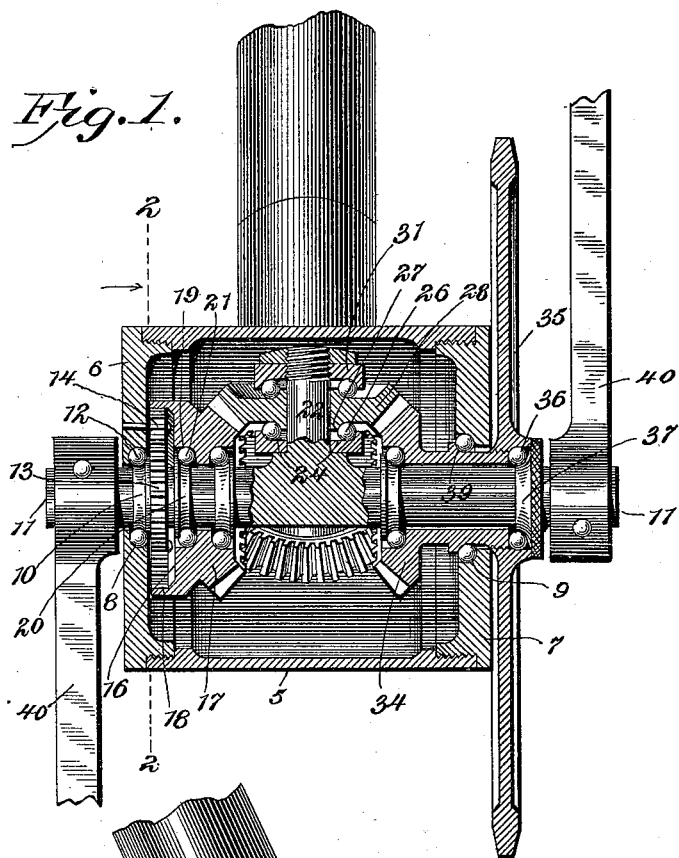
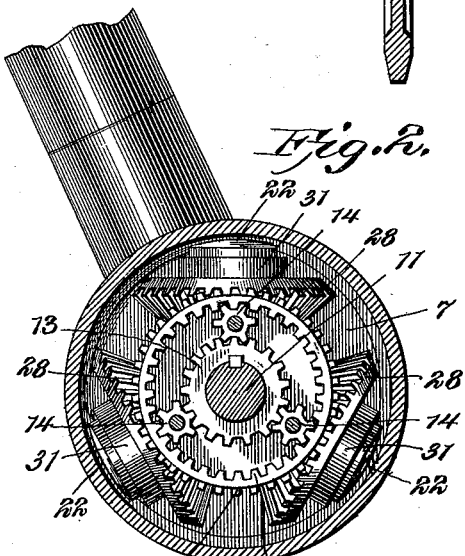
Witnesses
Howard D. Orr.
Geo. H. Chandlee.
Alford Brady, Inventor,
By his Attorneys,
C. A. Snow & Co.

UNITED STATES PATENT OFFICE.

ALFORD BRADY, OF GALVESTON, TEXAS, ASSIGNOR OF ONE-HALF TO GUS REYMERSHOFFER, M. ROSENBERGER, AND M. M. LEVY, OF SAME PLACE.

BICYCLE-GEAR.

SPECIFICATION forming part of Letters Patent No. 652,912, dated July 3, 1900.

Application filed August 30, 1899. Serial No. 728,996. (No model.)

*To all whom it may concern:*

Be it known that I, ALFORD BRADY, a citizen of the United States, residing at Galveston, in the county of Galveston and State of Texas, have invented a new and useful Bicycle-Gear, of which the following is a specification.

This invention relates to speed-gearing in general, and more particularly to a gear adapted for employment in connection with a bicycle and in which it is desired to rotate a sprocket or other form of gear-wheel upon a crank-shaft in the direction of and at a greater speed than that shaft.

A further object of the invention is to provide a compact construction for this purpose which may be disposed within the crank-hanger of the usual bicycle, although it will be readily understood that the invention includes any purpose for which the structure is adapted.

In the drawings forming a portion of this specification, and in which similar numerals of reference designate corresponding parts, Figure 1 is a vertical section, partially in elevation, of the gearing. Fig. 2 is a front elevation of the master bevel-gear, the crank-shaft being in section and showing the planetary gearing connecting it with said bevel-gear.

Referring now to the drawings, 5 represents a box, which may be the crank-hanger of a bicycle and with the opposite ends of which are adjustably-engaged disks 6 and 7, carrying races 8 and 9 or race elements. Coöperating with the elements 8 and 9 are additional elements, of which one element 10 is carried by a crank-shaft 11, intermediate which and the element 8 is disposed balls 12.

Fixed upon the shaft 11 is a gear 13, with which are engaged pinions 14, rotatably mounted upon stub-shafts carried by the disk 6, and which pinions lie in a recess 16 in the outer face of a bevel-gear 17, the annular wall or periphery of said recess having an internal gear 18 formed thereon, with which said pinions are in engagement. The bevel-gear referred to is mounted loosely with respect to the shaft 11 and has at its inner edge the race element 19, which coöperates with an element 20 upon the crank-shaft, and which elements have disposed between them bearing-balls 21. This bevel-gear is what is termed a "master-gear," for the reason that the other gears are operated from it.

Within the box 5 there is formed upon the shaft 11 three equally-spaced stub-shafts 22, carrying race elements 24 adjacent their inner ends and with which coöperate balls 26 and race elements 27, of which the latter are carried by bevel-gears 28, mounted loosely upon the stub-shafts and engaging the master-gear. These gears 28 are equal in diameter mutually and to the master-gear, and thus under the influence of the master-gear are rotated in opposite directions to the contiguous portions of the master-gear and with equal speeds. The gears 28 have additional race elements which coöperate with disks 31, carried by the stub-shafts 22, and intermediate which and their respective gears are disposed bearing-balls.

A fourth bevel-gear 34 is engaged with the gears 28 and is mounted loosely upon the shaft 11, said gear having a ball-bearing connection with the shaft at its inner end and having threaded upon its outer end a sprocket-wheel 35, carrying a race element 36, which in connection with a race element 37 upon the shaft 11 coöperates with intermediate bearing-balls. Upon the outer face of the extended hub 38 of the gear 34 there is formed a race element 39, which coöperates with the race element 9 and interposed bearing-balls, as shown. Thus it will be seen that upon rotation of the shaft 11 through the medium of the cranks 40 or in any other desired manner the master-gear will be rotated in an opposite direction by reason of the engagement of the pinions 14 with the gears 13 and 18. At the same time the gears 28 move bodily and rotatably over the face of the gear 17 and receive one complete rotation for each rotation of the shaft in addition to the speed contributed by the movement of the master-gear in a direction opposite to the direction of bodily movement of the gears 28—that is, if the master-gear were stationary the gears 28 would receive one rotation each time the shaft rotated once. As the master-gear moves in an opposite direction to that of the shaft, however, the gears 28 will move at an increased speed dependent upon the speed of the master-gear. As the gears 28 are rotated, they will rotate the gear 34 once for each rotation of the shaft, due to their own movement upon their respective stub-shafts plus one rotation due to the rotation of the stub-shaft about the axle of the crank-shaft in the manner well known, this speed being further increased because of the rotation of the master-gear and which increase depends upon the ratios of the master-gear, the crank-axle gear, and the intervening pinion. It will thus be seen that the sprocket-wheel instead of having two rotations for each rotation of the cranks will have a greater speed of rotation, and which speed may be varied by varying the proportions of the elements of the planetary gearing described between the crank-shaft and the master-gear.

Having thus described the invention, what is claimed is—

In a bicycle the combination with a tubular crank-hanger having disks engaged with its ends, said disks being movable into and out of the crank-hanger, of a crank-shaft passed through the disks and hanger and having a gear fixed thereon, a bevel-gear mounted loosely upon the crank-shaft and carrying an internal gear, said internal gear encircling the gear fixed upon the crank-shaft, pinions mounted upon a disk adjacent the internal gear and movable with the disk into and out of engagement with the internal gear and the gear that is fixed upon the crank-shaft, a plurality of stub-shafts upon the crank-shaft, bevel-gears rotatably mounted upon the stub-shafts and engaging the first-named bevel-gears, a bevel-gear mounted loosely upon the crank-shaft and engaging the bevel-gears upon the stub-shafts, and a sprocket secured to the loosely-mounted gear.

In testimony that I claim the foregoing as my own I have hereto affixed my signature in the presence of two witnesses.

ALFORD BRADY.

Witnesses:
J. F. MORAN,
L. RINAUX.